(12) United States Patent
Bassett

(10) Patent No.: US 8,910,581 B2
(45) Date of Patent: Dec. 16, 2014

(54) SIDE DRESSING FERTILIZER COULTER

(75) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 176 days.

(21) Appl. No.: 13/557,447

(22) Filed: Jul. 25, 2012

(65) Prior Publication Data

US 2014/0026792 A1    Jan. 30, 2014

(51) Int. Cl.
*A01C 23/02*    (2006.01)

(52) U.S. Cl.
USPC ............................................. 111/121; 111/194

(58) Field of Classification Search
USPC ......... 111/121, 120, 118, 190–195, 149, 157, 111/163–169
See application file for complete search history.

(56) References Cited

U.S. PATENT DOCUMENTS

| | | | |
|---|---|---|---|
| 114,002 A | 4/1871 | Godfrey | |
| 353,491 A | 2/1886 | Wells | |
| 523,508 A | 7/1894 | Bauer et al. | |
| 736,369 A | 8/1903 | Dynes et al. | |
| 803,088 A | 10/1905 | Barker | |
| 1,134,462 A | 4/1915 | Kendrick | |
| 1,158,023 A | 10/1915 | Beaver | |
| 1,247,744 A | 11/1917 | Trimble | |
| 1,260,752 A | 3/1918 | Casaday | |
| 1,321,040 A | 11/1919 | Hoffman | |
| 1,391,593 A | 9/1921 | Sweeting | |
| 1,398,668 A | 11/1921 | Bordsen | |
| 1,481,981 A | 1/1924 | Boye | |
| 1,791,462 A | 2/1931 | Bermel | |
| 1,901,299 A | 3/1933 | Johnson | |
| 1,901,778 A | 3/1933 | Schlag | |
| 2,014,334 A | 9/1935 | Johnson | |
| 2,058,539 A | 10/1936 | Welty et al. | |
| 2,285,932 A | 7/1939 | Leavitt | |
| 2,269,051 A | 1/1942 | Cahoy | |
| 2,341,143 A | 2/1944 | Herr | |

(Continued)

FOREIGN PATENT DOCUMENTS

| | | |
|---|---|---|
| BE | 551372 | 10/1956 |
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Christopher J Novosad
(74) *Attorney, Agent, or Firm* — Nixon Peabody LLP

(57) ABSTRACT

An agricultural side dressing fertilizer coulter row unit includes a first attachment member adapted to be rigidly connected to a towing frame, and a second attachment member pivotably coupled to the first attachment member for pivoting movement about a substantially vertical axis. A linkage is pivotably coupled to the second attachment member for pivoting movement of the trailing end of the linkage relative to the second attachment member, and a tool-carrying stem pivotably coupled to the trailing end of the linkage carries a rotatably mounted coulter wheel for forming a slit in the soil, a liquid fertilizer dispenser for dispensing fertilizer, and a rotatably mounted closing wheel for closing the slit. A biasing element is pivotably attached to the linkage and coupled to the second attachment member for urging the stem downwardly with a controllable force.

20 Claims, 8 Drawing Sheets

(56) References Cited

U.S. PATENT DOCUMENTS

| | | | |
|---|---|---|---|
| 2,505,276 A | 4/1950 | Boroski | |
| 2,561,763 A | 7/1951 | Waters et al. | |
| 2,593,176 A | 4/1952 | Patterson | |
| 2,611,306 A | 9/1952 | Strehlow et al. | |
| 2,612,827 A | 10/1952 | Baggette et al. | |
| 2,691,353 A | 10/1954 | Secondo | |
| 2,692,544 A | 10/1954 | Jessup | |
| 2,715,286 A | 8/1955 | Saveson | |
| 2,754,622 A | 7/1956 | Rohnert | |
| 2,771,044 A | 11/1956 | Putifer | |
| 2,773,343 A | 12/1956 | Oppel | |
| 2,777,373 A | 1/1957 | Pursche | |
| 2,799,234 A | 7/1957 | Chancey | |
| 2,805,574 A | 9/1957 | Jackson, Jr. et al. | |
| 2,925,872 A | 2/1960 | Darnell | |
| 2,960,358 A | 11/1960 | Christison | |
| 3,010,744 A | 11/1961 | Hollis | |
| 3,014,547 A | 12/1961 | Van der Lely | |
| 3,038,424 A | 6/1962 | Johnson | |
| 3,042,121 A | 7/1962 | Broetzman et al. | |
| 3,057,092 A | 10/1962 | Curlett | |
| 3,058,243 A | 10/1962 | McGee | |
| 3,065,879 A | 11/1962 | Jennings et al. | |
| 3,110,973 A | 11/1963 | Reynolds | |
| 3,122,901 A | 3/1964 | Thompson | |
| 3,123,152 A | 3/1964 | Biskis | |
| 3,188,989 A | 6/1965 | Johnston | |
| 3,213,514 A | 10/1965 | Evans | |
| 3,250,109 A | 5/1966 | Spyridakis | |
| 3,314,278 A | 4/1967 | Bergman | |
| 3,319,589 A | 5/1967 | Moran | |
| 3,351,139 A | 11/1967 | Schmitz et al. | |
| 3,355,930 A | 12/1967 | Fedorov | |
| 3,370,450 A | 2/1968 | Scheucher | |
| 3,420,273 A | 1/1969 | Greer | |
| 3,447,495 A | 6/1969 | Miller et al. | |
| 3,539,020 A | 11/1970 | Andersson et al. | 74/527 |
| 3,543,603 A | 12/1970 | Gley | 74/529 |
| 3,561,541 A | 2/1971 | Woelfel | 172/265 |
| 3,576,098 A | 4/1971 | Brewer | 56/295 |
| 3,581,685 A | 6/1971 | Taylor | 111/7 |
| 3,593,720 A | 7/1971 | Botterill et al. | 130/27 |
| 3,606,745 A | 9/1971 | Girodat | 56/20 |
| 3,635,495 A | 1/1972 | Orendorff | 280/415 |
| 3,653,446 A | 4/1972 | Kalmon | 172/4 |
| 3,701,327 A | 10/1972 | Krumholz | 111/81 |
| 3,708,019 A | 1/1973 | Ryan | 172/470 |
| 3,711,974 A | 1/1973 | Webb | 40/63 |
| 3,718,191 A | 2/1973 | Williams | 172/196 |
| 3,749,035 A | 7/1973 | Cayton et al. | 111/85 |
| 3,753,341 A | 8/1973 | Berg, Jr. et al. | 56/400.04 |
| 3,766,988 A | 10/1973 | Whitesides | 172/548 |
| 3,774,446 A | 11/1973 | Diehl | 73/194 |
| 3,906,814 A | 9/1975 | Magnussen | 74/483 PB |
| 3,939,846 A | 2/1976 | Drozhzhin et al. | 130/27 |
| 3,945,532 A | 3/1976 | Marks | 222/55 |
| 3,975,890 A | 8/1976 | Rodger | 56/208 |
| 4,009,668 A | 3/1977 | Brass et al. | 111/85 |
| 4,018,101 A | 4/1977 | Mihalic | 74/493 |
| 4,044,697 A | 8/1977 | Swanson | 111/66 |
| 4,055,126 A | 10/1977 | Brown et al. | 111/85 |
| 4,058,171 A | 11/1977 | van der Lely | 172/713 |
| 4,063,597 A | 12/1977 | Day | 172/126 |
| 4,096,730 A | 6/1978 | Martin | 72/352 |
| 4,099,576 A | 7/1978 | Jilani | 172/555 |
| 4,122,715 A | 10/1978 | Yokoyama et al. | 73/228 |
| 4,129,082 A | 12/1978 | Betulius | 111/7 |
| 4,141,200 A | 2/1979 | Johnson | 56/10.2 |
| 4,141,302 A | 2/1979 | Morrison, Jr. et al. | 111/52 |
| 4,141,676 A | 2/1979 | Jannen et al. | 417/539 |
| 4,142,589 A | 3/1979 | Schlagenhauf | 172/510 |
| 4,147,305 A | 4/1979 | Hunt | 239/167 |
| 4,149,475 A | 4/1979 | Bailey et al. | 111/66 |
| 4,157,661 A | 6/1979 | Schindel | 73/228 |
| 4,161,090 A | 7/1979 | Watts, Jr. | 52/301 |
| 4,173,259 A | 11/1979 | Heckenkamp | 172/10 |
| 4,182,099 A | 1/1980 | Davis et al. | 56/16.4 |
| 4,187,916 A | 2/1980 | Harden et al. | 172/146 |
| 4,191,262 A | 3/1980 | Sylvester | 172/459 |
| 4,196,567 A | 4/1980 | Davis et al. | 56/13.7 |
| 4,196,917 A | 4/1980 | Oakes et al. | 280/463 |
| 4,206,817 A | 6/1980 | Bowerman | 172/559 |
| 4,208,974 A | 6/1980 | Dreyer et al. | 111/85 |
| 4,213,408 A | 7/1980 | West et al. | 111/85 |
| 4,225,191 A | 9/1980 | Knoski | 301/9 |
| 4,233,803 A | 11/1980 | Davis et al. | 56/14.9 |
| 4,241,674 A | 12/1980 | Mellinger | 111/52 |
| 4,280,419 A | 7/1981 | Fischer | 111/80 |
| 4,295,532 A | 10/1981 | Williams et al. | 172/184 |
| 4,301,870 A | 11/1981 | Carre et al. | 172/7 |
| 4,307,674 A | 12/1981 | Jennings et al. | 111/85 |
| 4,311,104 A | 1/1982 | Steilen et al. | 111/85 |
| 4,317,355 A | 3/1982 | Hatsuno et al. | 72/342 |
| 4,359,101 A | 11/1982 | Gagnon | 172/38 |
| 4,375,837 A | 3/1983 | van der Lely et al. | 172/68 |
| 4,377,979 A | 3/1983 | Peterson et al. | 111/52 |
| 4,407,371 A | 10/1983 | Hohl | 172/253 |
| 4,430,952 A | 2/1984 | Murray | 111/85 |
| 4,433,568 A | 2/1984 | Kondo | 72/356 |
| 4,438,710 A | 3/1984 | Paladino | 111/3 |
| 4,445,445 A | 5/1984 | Sterrett | 111/7 |
| 4,461,355 A | 7/1984 | Peterson et al. | 172/156 |
| 4,481,830 A | 11/1984 | Smith et al. | 73/861.71 |
| 4,499,775 A | 2/1985 | Lasoen | 73/862.57 |
| 4,506,610 A | 3/1985 | Neal | 111/87 |
| 4,508,178 A | 4/1985 | Cowell et al. | 172/239 |
| 4,528,920 A | 7/1985 | Neumeyer | 111/85 |
| 4,530,405 A | 7/1985 | White | 172/126 |
| 4,537,262 A | 8/1985 | van der Lely | 172/146 |
| 4,538,688 A | 9/1985 | Szucs et al. | 172/555 |
| 4,550,122 A | 10/1985 | David et al. | 172/158 |
| 4,553,607 A | 11/1985 | Behn et al. | 172/156 |
| 4,580,506 A | 4/1986 | Fleischer et al. | 111/7 |
| 4,596,200 A | 6/1986 | Gafford et al. | 111/85 |
| 4,603,746 A | 8/1986 | Swales | 172/559 |
| 4,604,906 A | 8/1986 | Scarpa | 73/861.74 |
| 4,630,773 A | 12/1986 | Ortlip | 239/1 |
| 4,643,043 A | 2/1987 | Furuta et al. | 74/503 |
| 4,646,620 A | 3/1987 | Buchl | 91/1 |
| 4,650,005 A | 3/1987 | Tebben | 172/430 |
| 4,669,550 A | 6/1987 | Sittre | 172/559 |
| 4,671,193 A | 6/1987 | States | 111/73 |
| 4,674,578 A | 6/1987 | Bexten et al. | 172/126 |
| 4,703,809 A | 11/1987 | Van den Ende | 172/147 |
| 4,726,304 A | 2/1988 | Dreyer et al. | 111/73 |
| RE32,644 E * | 4/1988 | Brundage et al. | 251/30.01 |
| 4,738,461 A | 4/1988 | Stephenson et al. | 280/400 |
| 4,744,316 A | 5/1988 | Lienemann et al. | 111/69 |
| 4,762,075 A | 8/1988 | Halford | 111/73 |
| 4,765,190 A | 8/1988 | Strubbe | 73/861.72 |
| 4,768,387 A | 9/1988 | Kemp et al. | 73/861.73 |
| 4,779,684 A | 10/1988 | Schultz | 171/62 |
| 4,785,890 A | 11/1988 | Martin | 172/29 |
| 4,825,957 A | 5/1989 | White et al. | 172/126 |
| 4,825,959 A | 5/1989 | Wilhelm | 172/720 |
| 4,920,901 A | 5/1990 | Pounds | 111/164 |
| 4,926,767 A | 5/1990 | Thomas | 111/187 |
| 4,930,431 A | 6/1990 | Alexander | 111/164 |
| 4,986,367 A | 1/1991 | Kinzenbaw | 172/126 |
| 4,998,488 A | 3/1991 | Hansson | 111/187 |
| 5,015,997 A | 5/1991 | Strubbe | 340/684 |
| 5,027,525 A | 7/1991 | Haukaas | 33/624 |
| 5,033,397 A | 7/1991 | Colburn, Jr. | 111/118 |
| 5,065,632 A | 11/1991 | Reuter | 73/861.73 |
| 5,074,227 A | 12/1991 | Schwitters | |
| 5,076,180 A | 12/1991 | Schneider | 111/139 |
| 5,092,255 A | 3/1992 | Long et al. | 111/167 |
| 5,113,957 A | 5/1992 | Tamai et al. | 172/10 |
| 5,129,282 A | 7/1992 | Bassett et al. | 74/529 |
| 5,136,934 A | 8/1992 | Darby, Jr. | 100/125 |
| 5,190,112 A | 3/1993 | Johnston et al. | 172/245 |
| 5,234,060 A | 8/1993 | Carter | 172/413 |
| 5,240,080 A | 8/1993 | Bassett et al. | 172/740 |
| 5,255,617 A | 10/1993 | Williams et al. | 111/140 |

(56) References Cited

U.S. PATENT DOCUMENTS

| | | | |
|---|---|---|---|
| 5,269,237 A | 12/1993 | Baker et al. | 111/121 |
| 5,282,389 A | 2/1994 | Faivre et al. | 73/861.73 |
| 5,285,854 A | 2/1994 | Thacker et al. | 172/176 |
| 5,333,694 A | 8/1994 | Roggenbuck et al. | 172/156 |
| 5,337,832 A | 8/1994 | Bassett | 172/504 |
| 5,341,754 A | 8/1994 | Winterton | 111/139 |
| 5,346,019 A | 9/1994 | Kinzenbaw et al. | 172/311 |
| 5,346,020 A | 9/1994 | Bassett | 172/540 |
| 5,349,911 A | 9/1994 | Holst et al. | 111/139 |
| 5,351,635 A | 10/1994 | Hulicsko | 111/135 |
| 5,379,847 A | 1/1995 | Snyder | 172/128 |
| 5,394,946 A | 3/1995 | Clifton et al. | 172/139 |
| 5,398,771 A | 3/1995 | Hornung et al. | 172/156 |
| 5,419,402 A | 5/1995 | Heintzman | 172/551 |
| 5,427,192 A | 6/1995 | Stephenson et al. | 180/53.1 |
| 5,443,023 A | 8/1995 | Carroll | 111/191 |
| 5,443,125 A | 8/1995 | Clark et al. | 172/608 |
| 5,461,995 A | 10/1995 | Winterton | 111/139 |
| 5,462,124 A | 10/1995 | Rawson | 172/569 |
| 5,473,999 A | 12/1995 | Rawson et al. | 111/127 |
| 5,477,682 A | 12/1995 | Tobiasz | 60/583 |
| 5,477,792 A | 12/1995 | Bassett et al. | 111/121 |
| 5,479,868 A | 1/1996 | Bassett | 111/139 |
| 5,479,992 A | 1/1996 | Bassett | 172/4 |
| 5,485,796 A | 1/1996 | Bassett | 111/33 |
| 5,485,886 A | 1/1996 | Bassett | 172/763 |
| 5,497,717 A | 3/1996 | Martin | 111/139 |
| 5,497,837 A | 3/1996 | Kehrney | 172/619 |
| 5,499,683 A | 3/1996 | Bassett | 172/4 |
| 5,499,685 A | 3/1996 | Downing, Jr. | 172/699 |
| 5,517,932 A | 5/1996 | Ott et al. | 111/193 |
| 5,524,525 A | 6/1996 | Nikkel et al. | 91/179 |
| 5,531,171 A | 7/1996 | Whitesel et al. | 111/121 |
| 5,542,362 A | 8/1996 | Bassett | 111/120 |
| 5,544,709 A | 8/1996 | Lowe et al. | 172/661 |
| 5,562,165 A | 10/1996 | Janelle et al. | 172/4 |
| 5,590,611 A | 1/1997 | Smith | 111/127 |
| 5,603,269 A | 2/1997 | Bassett | 111/52 |
| 5,623,997 A | 4/1997 | Rawson et al. | 172/156 |
| 5,640,914 A | 6/1997 | Rawson | 111/140 |
| 5,657,707 A | 8/1997 | Dresher et al. | 111/139 |
| 5,660,126 A | 8/1997 | Freed et al. | 111/140 |
| 5,685,245 A | 11/1997 | Bassett | 111/62 |
| 5,704,430 A | 1/1998 | Smith et al. | 172/29 |
| 5,709,271 A | 1/1998 | Bassett | 172/4 |
| 5,727,638 A | 3/1998 | Wodrich et al. | 172/414 |
| 5,730,074 A | 3/1998 | Peter | 111/118 |
| 5,852,982 A | 12/1998 | Peter | 111/118 |
| 5,868,207 A | 2/1999 | Langbakk et al. | 172/274 |
| 5,878,678 A | 3/1999 | Stephens et al. | 111/139 |
| RE36,243 E | 7/1999 | Rawson et al. | 111/121 |
| 5,970,891 A | 10/1999 | Schlagel | 111/135 |
| 5,970,892 A | 10/1999 | Wendling et al. | 111/139 |
| 5,988,293 A | 11/1999 | Brueggen et al. | 172/414 |
| 6,067,918 A | 5/2000 | Kirby | 111/121 |
| 6,164,385 A | 12/2000 | Buchl | 172/239 |
| 6,223,663 B1 | 5/2001 | Wendling et al. | 111/139 |
| 6,223,828 B1 | 5/2001 | Paulson et al. | 171/63 |
| 6,237,696 B1 | 5/2001 | Mayerle | 172/558 |
| 6,253,692 B1 | 7/2001 | Wendling et al. | 111/139 |
| 6,289,829 B1 | 9/2001 | Fish et al. | 111/121 |
| 6,314,897 B1 | 11/2001 | Hagny | 111/192 |
| 6,325,156 B1 | 12/2001 | Barry | 172/518 |
| 6,330,922 B1 | 12/2001 | King | 172/166 |
| 6,331,142 B1 | 12/2001 | Bischoff | 460/112 |
| 6,343,661 B1 | 2/2002 | Thompson et al. | 172/444 |
| 6,347,594 B1 | 2/2002 | Wendling et al. | 111/167 |
| 6,382,326 B1 | 5/2002 | Goins et al. | 172/239 |
| 6,389,999 B1 | 5/2002 | Duello | 111/200 |
| 6,453,832 B1 | 9/2002 | Schaffert | 111/150 |
| 6,454,019 B1 | 9/2002 | Prairie et al. | 172/677 |
| 6,460,623 B1 | 10/2002 | Knussman et al. | 172/4 |
| 6,516,595 B2 | 2/2003 | Rhody et al. | 56/10.2 E |
| 6,530,334 B2 | 3/2003 | Hagny | 111/189 |
| 6,575,104 B2 | 6/2003 | Brummelhuis | 111/139 |
| 6,644,224 B1 | 11/2003 | Bassett | 111/157 |
| 6,701,856 B1 | 3/2004 | Zoke et al. | 111/121 |
| 6,701,857 B1 | 3/2004 | Jensen et al. | 111/200 |
| 6,763,773 B2 | 7/2004 | Schaffert | 111/150 |
| 6,786,130 B2 | 9/2004 | Steinlage et al. | 91/390 |
| 6,834,598 B2 | 12/2004 | Jüptner | 111/140 |
| 6,840,853 B2 | 1/2005 | Foth | 460/111 |
| 6,886,650 B2 | 5/2005 | Bremmer | 180/89.13 |
| 6,889,943 B2 | 5/2005 | Dinh et al. | 248/34 |
| 6,892,656 B2 | 5/2005 | Schneider | 111/121 |
| 6,912,963 B2 | 7/2005 | Bassett | 111/163 |
| 6,986,313 B2 | 1/2006 | Halford et al. | 111/186 |
| 6,997,400 B1 | 2/2006 | Hanna et al. | 239/383 |
| 7,004,090 B2 | 2/2006 | Swanson | 111/119 |
| 7,044,070 B2 | 5/2006 | Kaster et al. | 111/62 |
| 7,063,167 B1 | 6/2006 | Staszak et al. | 172/328 |
| 7,159,523 B2 | 1/2007 | Bourgault et al. | 111/187 |
| 7,222,575 B2 | 5/2007 | Bassett | 111/140 |
| 7,290,491 B2 | 11/2007 | Summach et al. | 111/181 |
| 7,360,494 B2 | 4/2008 | Martin | 111/164 |
| 7,360,495 B1 | 4/2008 | Martin | 111/164 |
| 7,438,006 B2 | 10/2008 | Mariman et al. | 111/164 |
| 7,451,712 B2 | 11/2008 | Bassett et al. | 111/140 |
| 7,523,709 B1 | 4/2009 | Kiest | 111/119 |
| 7,540,333 B2 | 6/2009 | Bettin et al. | 172/744 |
| 7,575,066 B2 | 8/2009 | Bauer | 172/540 |
| 7,584,707 B2 | 9/2009 | Sauder et al. | 111/140 |
| 7,665,539 B2 | 2/2010 | Bassett et al. | 172/540 |
| 7,673,570 B1 | 3/2010 | Bassett | 111/63 |
| 7,743,718 B2 | 6/2010 | Bassett | 111/135 |
| 7,870,827 B2 | 1/2011 | Bassett | 111/119 |
| 7,938,074 B2 | 5/2011 | Liu | 111/200 |
| 7,946,231 B2 | 5/2011 | Martin et al. | 111/60 |
| 8,146,519 B2 | 4/2012 | Bassett | 111/119 |
| 8,151,717 B2 | 4/2012 | Bassett | 111/135 |
| 8,380,356 B1 | 2/2013 | Zielke et al. | 700/284 |
| 8,386,137 B2 | 2/2013 | Sauder et al. | 701/50 |
| 8,393,407 B2 | 3/2013 | Freed | 172/551 |
| 8,408,149 B2 | 4/2013 | Rylander | 111/140 |
| 8,550,020 B2 | 10/2013 | Sauder et al. | 111/200 |
| 8,573,319 B1 | 11/2013 | Casper et al. | 172/4 |
| 8,634,992 B2 | 1/2014 | Sauder et al. | 701/50 |
| 2002/0162492 A1 | 11/2002 | Juptner | 111/140 |
| 2005/0045080 A1 | 3/2005 | Halford et al. | 111/118 |
| 2006/0102058 A1 | 5/2006 | Swanson | 111/119 |
| 2006/0191695 A1 | 8/2006 | Walker et al. | 172/452 |
| 2006/0237203 A1 | 10/2006 | Miskin | 172/799.5 |
| 2007/0044694 A1 | 3/2007 | Martin | 111/121 |
| 2007/0272134 A1 | 11/2007 | Baker et al. | 111/163 |
| 2008/0093093 A1 | 4/2008 | Sheppard et al. | 172/2 |
| 2008/0236461 A1 | 10/2008 | Sauder et al. | 111/170 |
| 2008/0256916 A1 | 10/2008 | Vaske et al. | 56/13.5 |
| 2010/0019471 A1 | 1/2010 | Ruckle et al. | 280/504 |
| 2010/0108336 A1 | 5/2010 | Thomson et al. | 172/795 |
| 2010/0180695 A1 | 7/2010 | Sauder et al. | 73/862.045 |
| 2010/0198529 A1 | 8/2010 | Sauder et al. | 702/41 |
| 2010/0282480 A1 | 11/2010 | Breker et al. | 172/170 |
| 2011/0036602 A1 | 2/2011 | Bassett | 172/1 |
| 2011/0088603 A1 | 4/2011 | Bassett | 111/121 |
| 2011/0247537 A1 | 10/2011 | Freed | 111/140 |
| 2011/0313575 A1 | 12/2011 | Kowalchuk et al. | 700/282 |
| 2012/0060730 A1 | 3/2012 | Bassett | 111/149 |
| 2012/0060731 A1 | 3/2012 | Bassett | 111/149 |
| 2012/0167809 A1 | 7/2012 | Bassett | 111/119 |
| 2012/0186216 A1 | 7/2012 | Vaske et al. | 56/367 |
| 2012/0216731 A1 | 8/2012 | Schilling et al. | 111/69 |
| 2012/0232691 A1 | 9/2012 | Green et al. | 700/231 |
| 2012/0255475 A1 | 10/2012 | Mariman et al. | 111/149 |
| 2013/0032363 A1 | 2/2013 | Curry et al. | 172/4 |
| 2013/0112121 A1 | 5/2013 | Achen et al. | 111/14 |
| 2013/0112124 A1 | 5/2013 | Bergen et al. | 111/151 |
| 2014/0026748 A1 | 1/2014 | Stoller et al. | 91/418 |
| 2014/0034339 A1 | 2/2014 | Sauder et al. | 172/2 |
| 2014/0034343 A1 | 2/2014 | Sauder et al. | 172/664 |

FOREIGN PATENT DOCUMENTS

| | | |
|---|---|---|
| DE | 335464 | 9/1921 |
| DE | 1108971 | 6/1961 |

(56) References Cited

FOREIGN PATENT DOCUMENTS

| | | | |
|---|---|---|---|
| DE | 24 02 411 | 7/1975 | ............ E01C 23/08 |
| EP | 2 497 348 A1 | 9/2012 | ............ A01B 79/00 |
| GB | 1 574 412 | 9/1980 | ................ 111/123 |
| GB | 2 056 238 A | 10/1982 | |
| JP | 54-57726 | 5/1979 | .................. 74/529 |
| SU | 392897 | 8/1973 | |
| SU | 436778 | 7/1974 | |
| SU | 611201 | 6/1978 | .................. 74/527 |
| SU | 625648 | 9/1978 | |
| SU | 1410884 A1 | 7/1988 | |
| SU | 1466674 | 3/1989 | ................ 111/124 |
| WO | WO 2011/161140 A1 | 12/2011 | ............ A01C 7/20 |
| WO | WO 2012/149367 A1 | 1/2012 | ............ A01C 5/00 |
| WO | WO 2012/149415 A1 | 1/2012 | ......... A01B 63/111 |
| WO | WO 2012/167244 A1 | 12/2012 | ............ A01B 5/00 |
| WO | WO 2013/025898 A1 | 2/2013 | ............ B60C 23/02 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manuel, date estimated as early as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels!!'*" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Martin Industries, LLC Paired 13 Spading Closing Wheels Brochure, date estimated as early as Jun. 6, 2012, pp. 18-25 (8 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http:///www.deere.com/en_US/parts/agparts/semiactiveseat.html, date estimated as early as Jan. 2014, retrieved Feb. 6, 2014 (2 pages).

\* cited by examiner

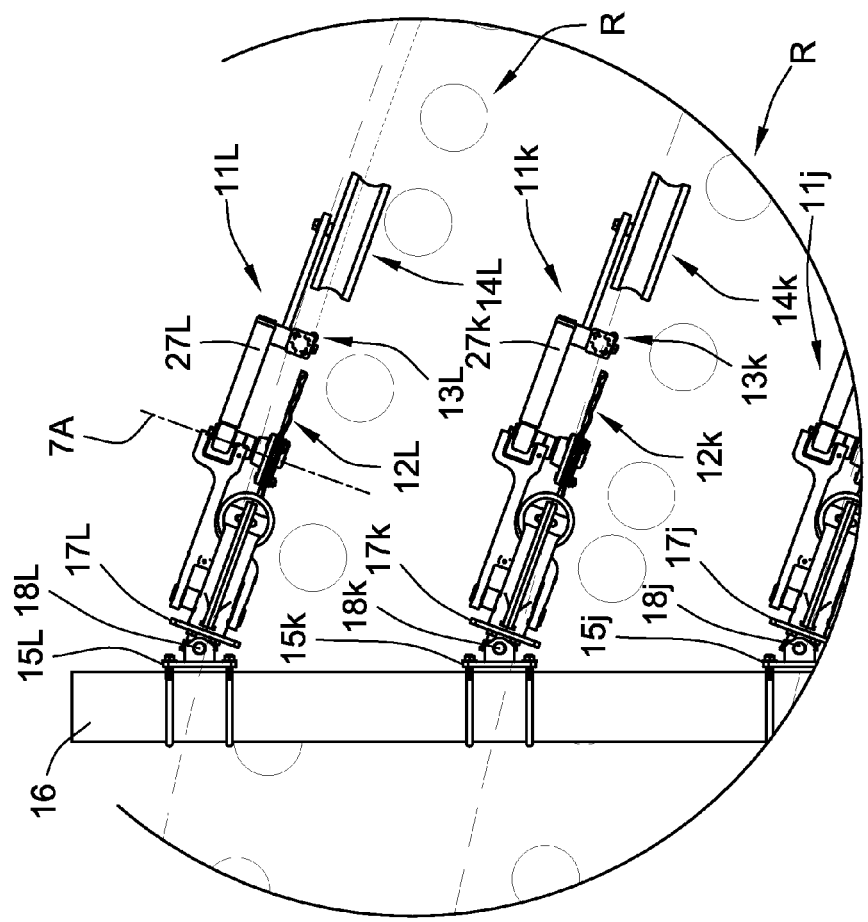
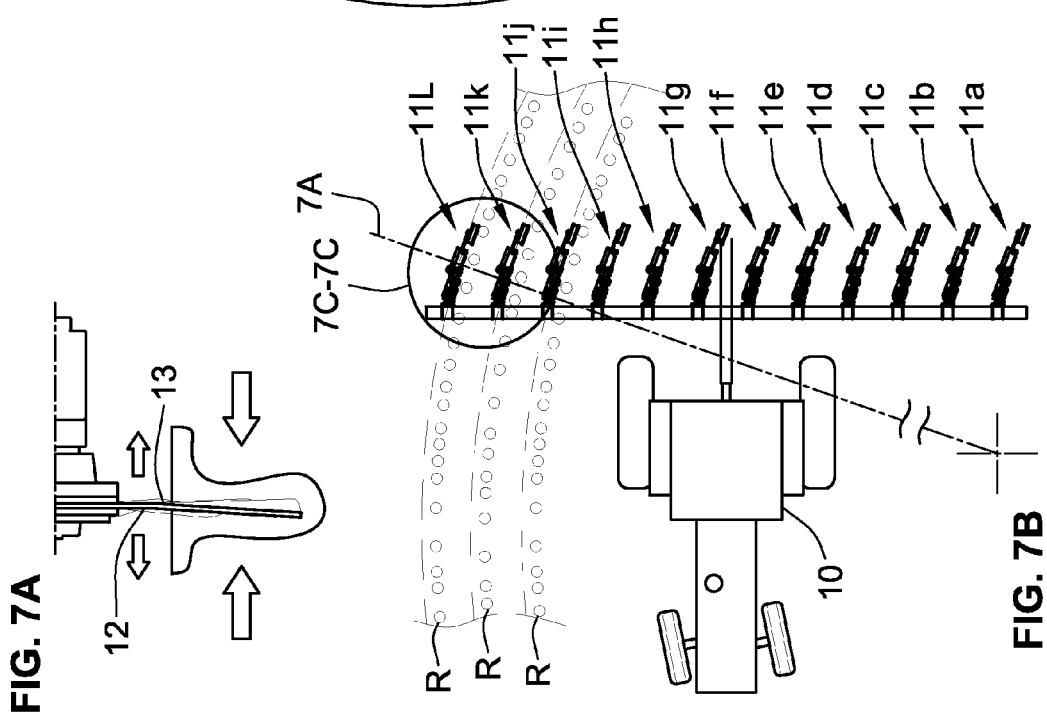

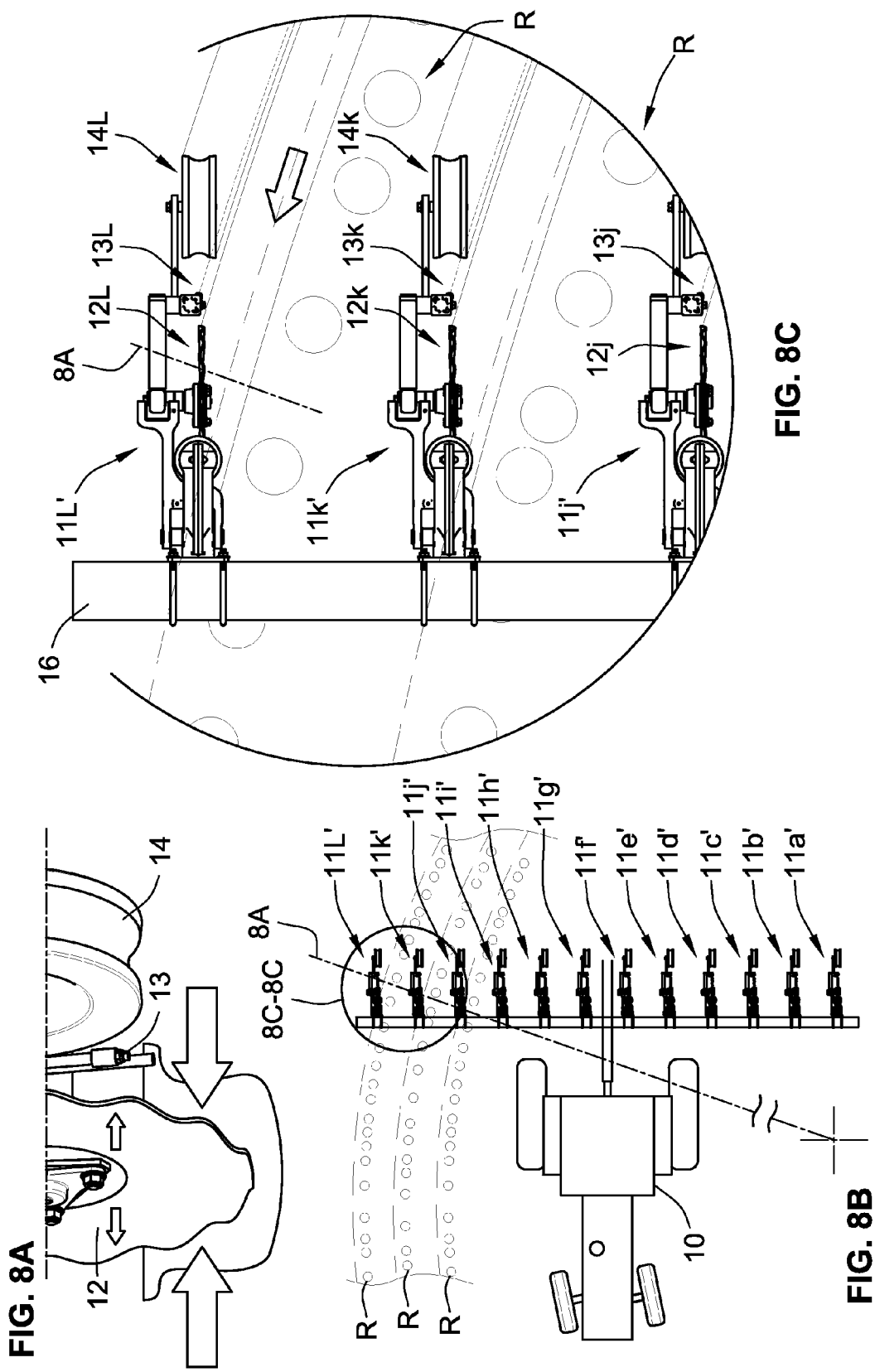

SIDE DRESSING FERTILIZER COULTER

FIELD OF THE INVENTION

The present invention relates generally to agricultural implements and, more particularly, to a side dressing fertilizer coulter.

BACKGROUND OF THE INVENTION

As an agricultural planter row unit travels across fields with variable soil types, soil moisture, residue levels and topography, it is difficult to maintain a constant depth of fertilizer and/or seed due to the changing conditions. This problem is complicated by the fact that the optimum pressure for any given soil condition can be different for different implements carried by the same row unit. For example, hard soil might require increasing the down pressure of the soil-opening implement more than the down pressure of residue-clearing devices and closing implements carried on the same row unit. On the other hand, farming with higher residue levels may require greater increases in the down pressures for the row-clearing devices than for the opening and closing implements.

As computers and GPS systems have allowed crop production to be managed in a location-specific way as an implement moves through a field, it has become necessary to achieve more rapid changes in the setting or adjustment of the various implements.

SUMMARY

In one embodiment, an agricultural side dressing fertilizer coulter row unit for use with a towing frame hitched to a tractor includes a first attachment member adapted to be rigidly connected to the towing frame, and a second attachment member pivotably coupled to the first attachment member for pivoting movement about a substantially vertical axis. A linkage is pivotably coupled to the second attachment member for pivoting movement of the trailing end of the linkage relative to the second attachment member, and a tool-carrying stem is pivotably coupled to the trailing end of the linkage. The stem carries a rotatably mounted coulter wheel for forming a slit in the soil, a liquid fertilizer dispenser for dispensing fertilizer into the slit, and a rotatably mounted closing wheel for closing the slit after fertilizer has been dispensed into the slit. A biasing element is pivotably attached to the linkage and coupled to the second attachment member for urging the stem downwardly with a controllable force. The biasing element may be an air spring, and the linkage may be a parallel linkage.

In one implementation, the fertilizer dispenser is positioned to dispense fertilizer within the slit behind the trailing edge of the coulter wheel, and the closing wheel is positioned directly behind the fertilizer dispenser for closing the slit after the fertilizer has been dispensed into the slit. The closing wheel preferably has a concave soil-engaging surface.

The biasing element may be remotely controllable to permit adjustment of the controllable force produced to urge the stem downwardly toward the soil, thereby permitting adjustment of the downward force urging the coulter wheel and the closing wheel against the soil. Stopping elements may be located between the first and second attachment members for limiting the range of pivoting movement of the second attachment element about the substantially vertical axis.

BRIEF DESCRIPTION OF THE DRAWINGS

The invention may best be understood by reference to the following description taken in conjunction with the accompanying drawings, in which:

FIG. 7A is a diagrammatic view of the tractor and fertilizer coulters shown in FIG. 1, in a field having curved rows of crops.

FIG. 7B is an enlargement of the circled portion of FIG. 7A.

FIG. 7C is an enlarged section taken along line 7C-7C in FIG. 7B.

FIG. 8A is a diagrammatic view of the tractor and fertilizer coulters shown in FIG. 1 but without the pivotable attachment frames, in a field having curved rows of crops.

FIG. 8B is an enlargement of the circled portion of FIG. 8A.

FIG. 8C is an enlarged section taken along line 8C-8C in FIG. 8B.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
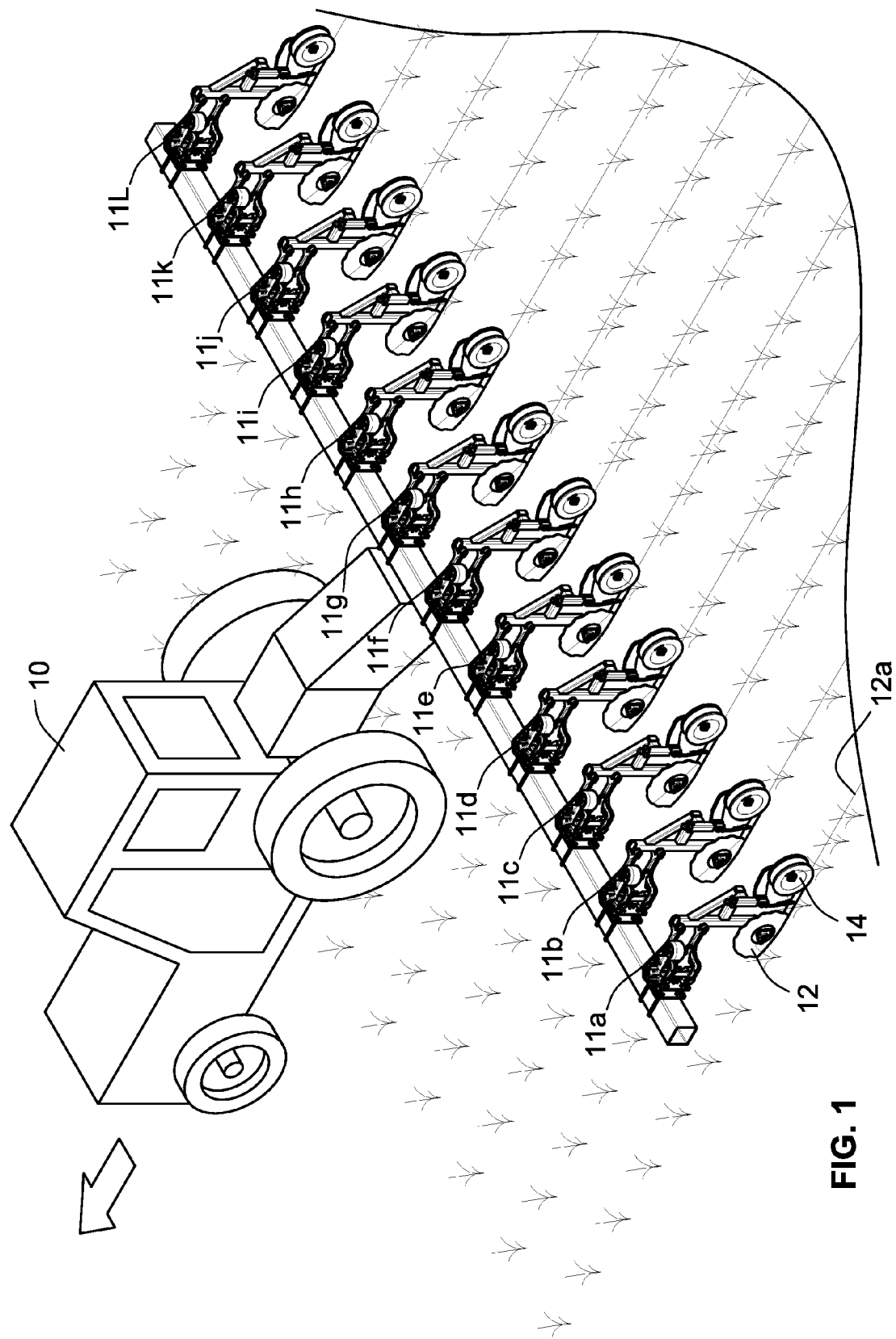
FIG. 1 is a perspective view of a tractor pulling multiple side dressing fertilizer coulters through a planted field.

Turning now to the drawings and referring first to FIG. 1, a tractor 10 is shown pulling multiple side dressing fertilizer coulter row units 11a-11l through a field that has been planted. The crop is at a seedling stage, when fertilizer is typically applied as a "side dressing," i.e., slightly offset laterally from each row of seedlings. As can be seen more clearly in FIG. 2, each of the fertilizer coulter row units 11a-11l includes a coulter wheel 12 for forming a slit in the soil, and at least one dispensing device 13 for depositing liquid fertilizer into the slit, and a closing wheel 14 for closing the slit to capture and retain the fertilizer in the soil. The front end of the row unit 10 includes a first attachment plate 15 adapted for connection to a conventional towing frame 16 that is hitched to the tractor 10. The rear side of the attachment plate 15 of each row unit 11 is pivotably coupled to the front side of a second attachment plate 17 by a vertical shaft 18 that passes through a pair of bosses 15a and 15b on the first plate and a cylinder 19 on the second attachment plate 17. The shaft 18 is locked in place by a bolt 18a that passes through the upper boss 15a and the portion of the shaft 18 within that boss.

The rear side of the second attachment plate 17 is rigidly bolted to a post 20 that supports the leading ends of a parallel linkage 21, which in turn supports a cradle 22 by four bolts 17a-17d. The post 20 fits within a pair of forks formed by the leading ends of the two arms 23 and 24 of the linkage 21 (see FIG. 5), and the two arms 23 and 24 are pivotably connected to the post 20 by respective rods 25a and 25b that extend through the post 20. The two arms 23 and 24 are also pivotably coupled to the cradle 22 by a pair of pins 26a and 26b, and the trailing ends of the arms 23 and 24 are pivotably coupled to a tool-support arm 27 by a pair of pins 28 and 29.

The cradle 22 is attached to the lower end of an air spring 30, while the upper end of the air spring 30 is attached to a cantilevered portion 20a of the post 20. When the air pressure in the spring 30 is increased, the expansion of the air spring pushes downwardly on the linkage arms 23 and 24, which urges the arms 23 and 24 downwardly away from the cantilevered portion 20a of the post 20. When the air spring 30 is expanded by increasing the air pressure supplied to the spring, the downward force applied to the pivotably mounted arms 23 and 24 of the parallel linkage 21 is increased. This downward pressure can (1) pivot the trailing end of the linkage 21 downwardly around the axes of the pivotable connection between the linkage 21 and the post 20, and/or (2) increase the downward pressure on the tool-support arm 27 that is pivotably coupled to yokes formed by bifurcated trailing ends of the arms 23 and 24. Conversely, when the air spring 30 is contracted by reducing the air pressure supplied to the spring, the downward pressure on the arms 23 and 24 is reduced, which can (1) pivot the trailing end of the linkage 21 upwardly around the axes of the pivotable connection between the linkage 21 and the post 20 and/or (2) decrease the downward pressure on the tool-support arm 27.

The tool-support arm 27 carries the coulter wheel 12, the fertilizer dispenser 13 and the closing wheel 14. Thus, the downward pressure on both of the ground-engaging tools (the coulter wheel 12 and the closing wheel 14) may be remotely adjusted for different soil conditions by adjusting the air pressure supplied to the air spring 30.

As the row units 11a-11l are advanced by the tractor 10, each coulter wheel 12 penetrates the soil to form a slit, and the dispensing device 13 injects liquid fertilizer into the slit. Then the slit is immediately closed by the closing wheel 14, which distributes loosened soil back into the slit. The closing wheel 14 also serves as a gauge wheel to control the depth of the slit and the elevation at which the liquid fertilizer is injected into the slit. Containers (not shown) on the row unit carry the fertilizer to be injected into the soil.

Figure 2:
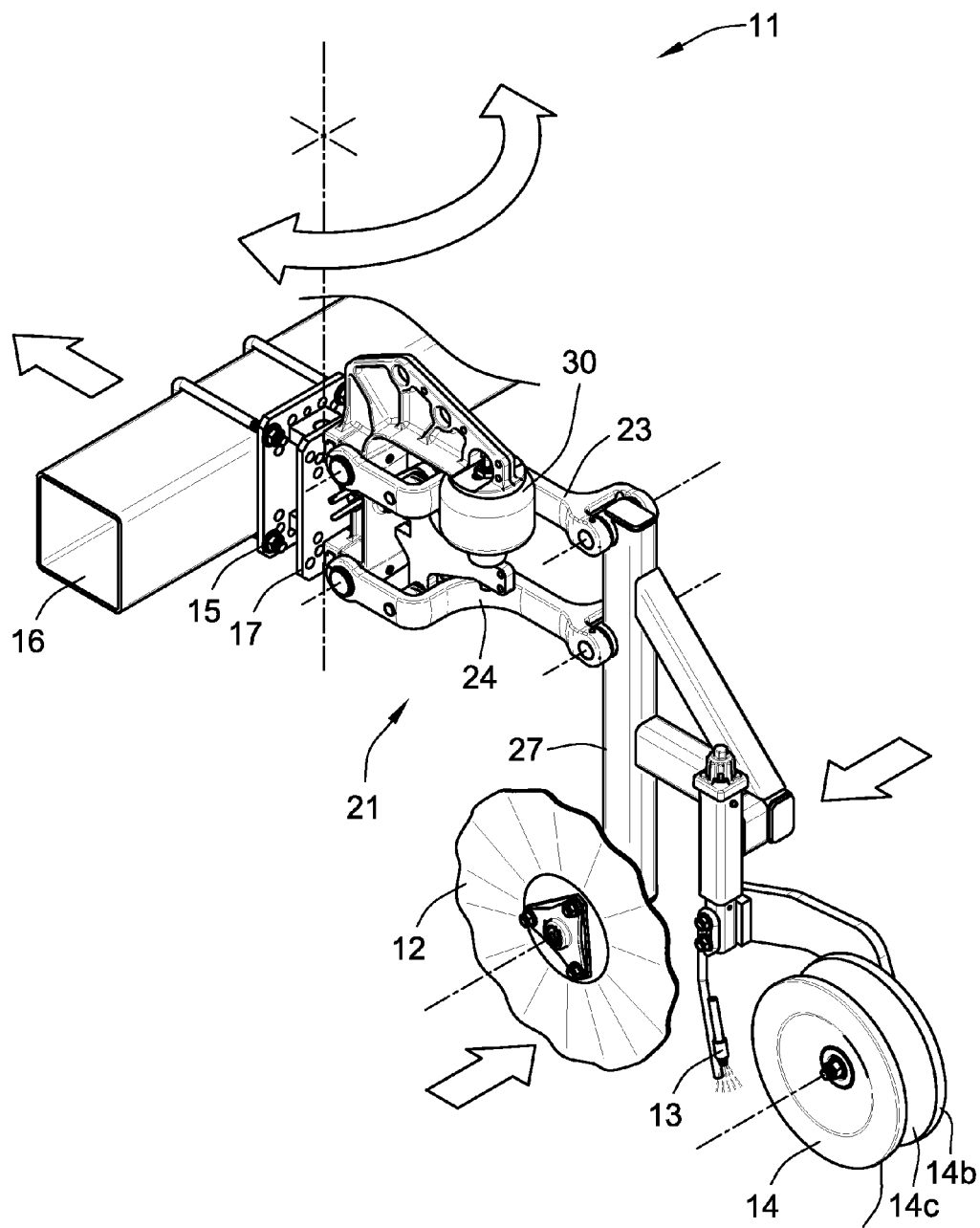
FIG. 2 is an enlarged perspective of one of the side dressing fertilizer coulter row units shown in FIG. 1.
Figure 3B:
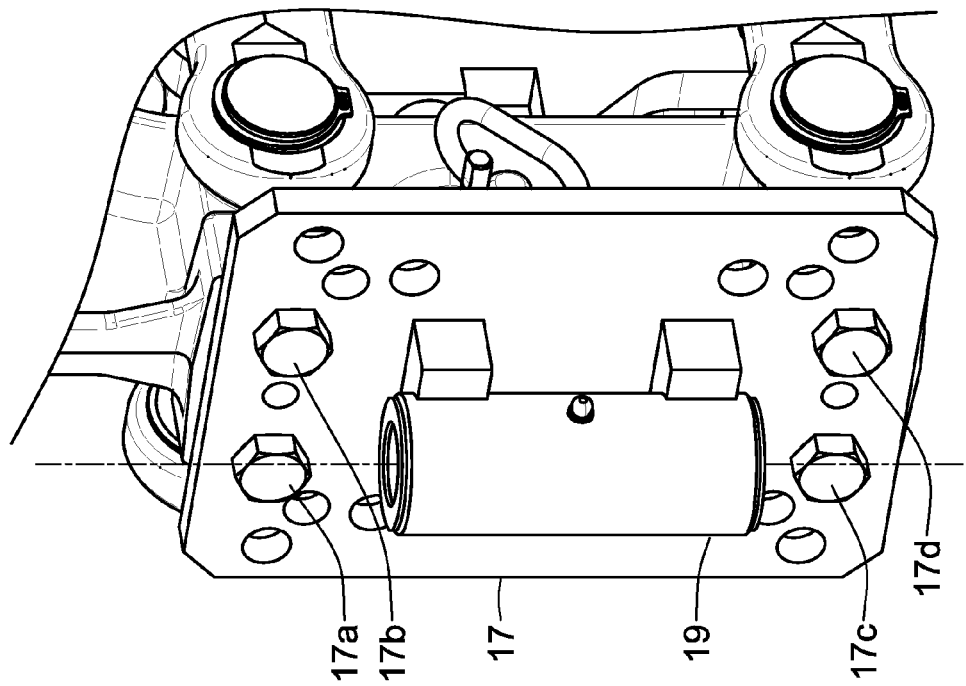
FIG. 3B is a further enlarged front perspective of a second attachment member in the row unit shown in FIG. 2.
Figure 3A:
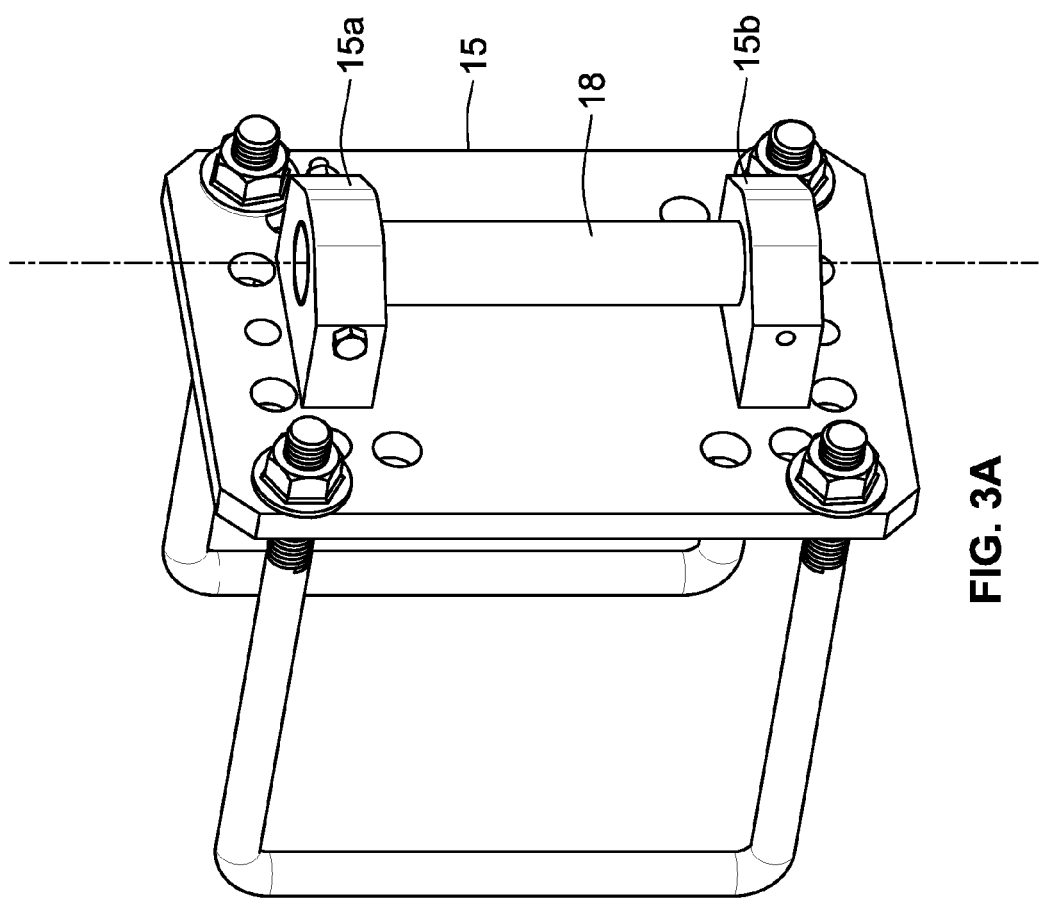
FIG. 3A is a further enlarged rear perspective of a first attachment member in the row unit shown in FIG. 2.
Figure 4B:
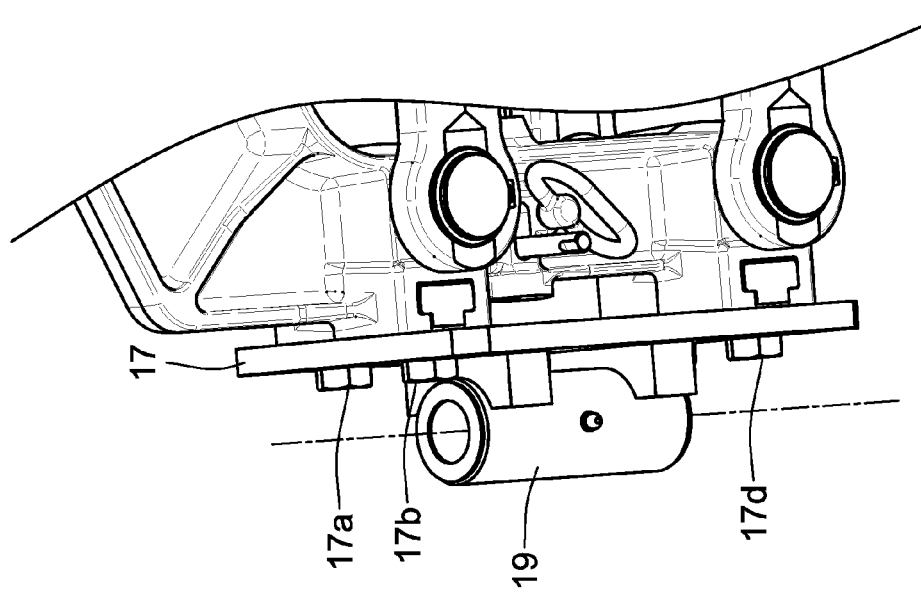
FIG. 4B is a top perspective of the second attachment member shown in FIG. 3B.
Figure 4A:
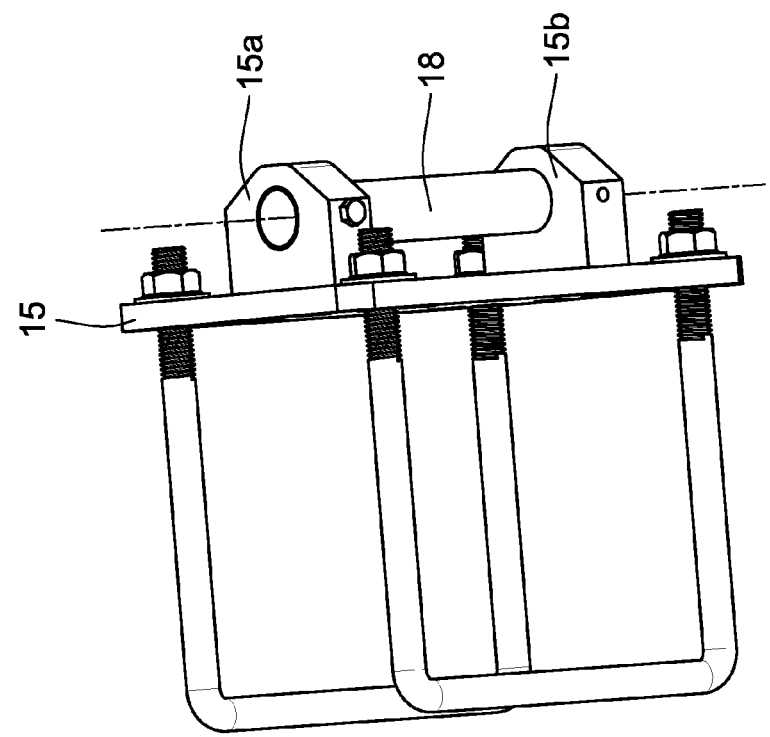
FIG. 4A is a top perspective of the first attachment member shown in FIG. 3A.

As can be seen in FIG. 2, the fertilizer dispenser 13 is positioned directly behind the trailing edge of the coulter wheel 14, at an elevation slightly below the surface of the soil so that the discharge nozzle is located within the slit opened by the coulter wheel. The discharge nozzle directs the liquid fertilizer downwardly into the slit (see FIG. 3) so that virtually all the fertilizer is still within the slit when the slit is closed by the closing wheel 14, which follows directly behind the dispenser 13. As can be seen in FIG. 2, the soil-engaging surface of the closing wheel 14 is concave so that the outer edges 14a and 14b penetrate deeper into the soil than the central portion 14c, thereby collapsing the side walls of the slit inwardly to close the slit and compact the soil at the top of the closed slit.

Figure 5:
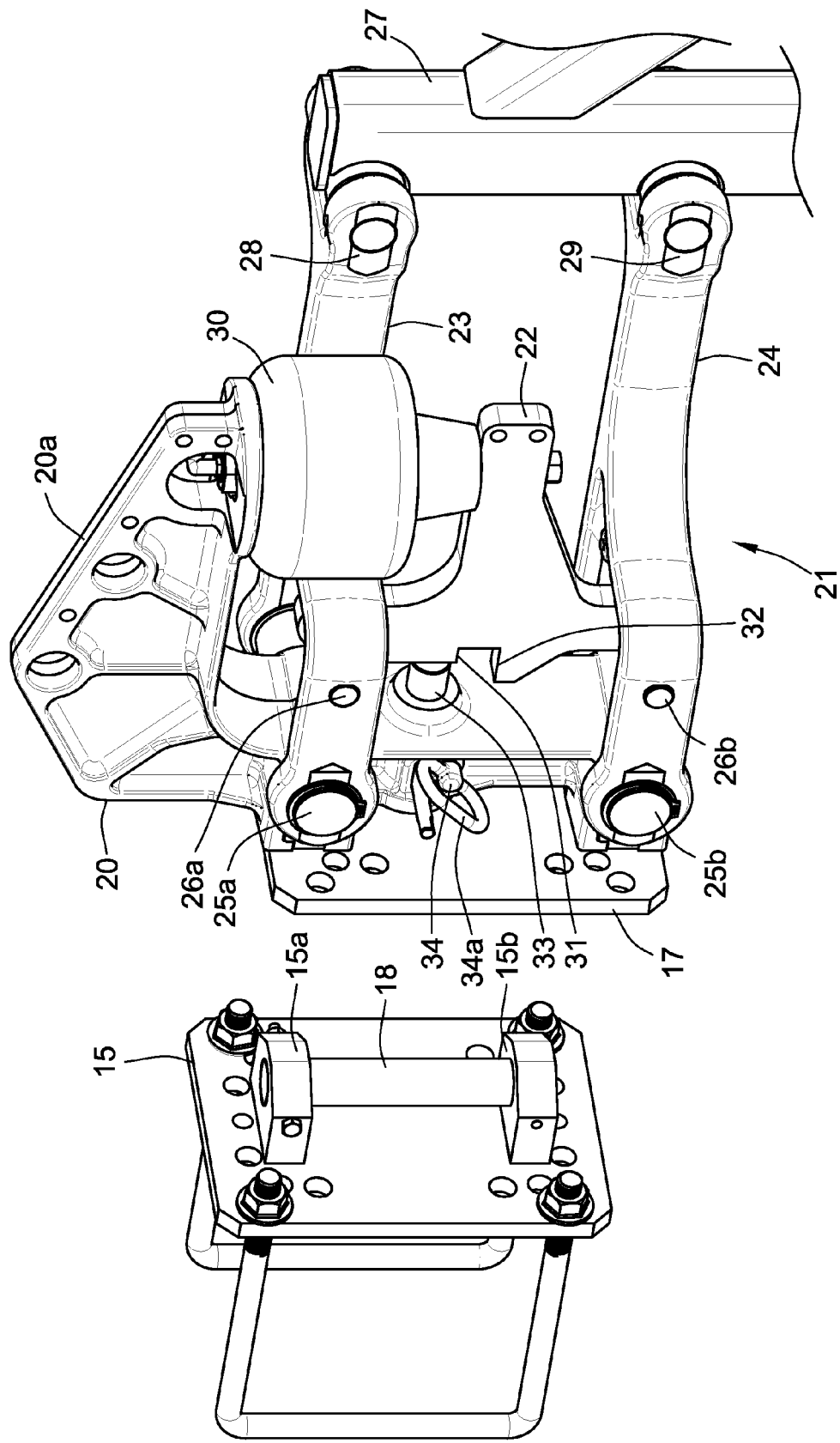
FIG. 5 is an exploded perspective of the first and second attachment members shown in FIGS. 3A, 3B, 4A and 4B, along with the parallel linkage coupled to the second attachment member.
Figure 6:
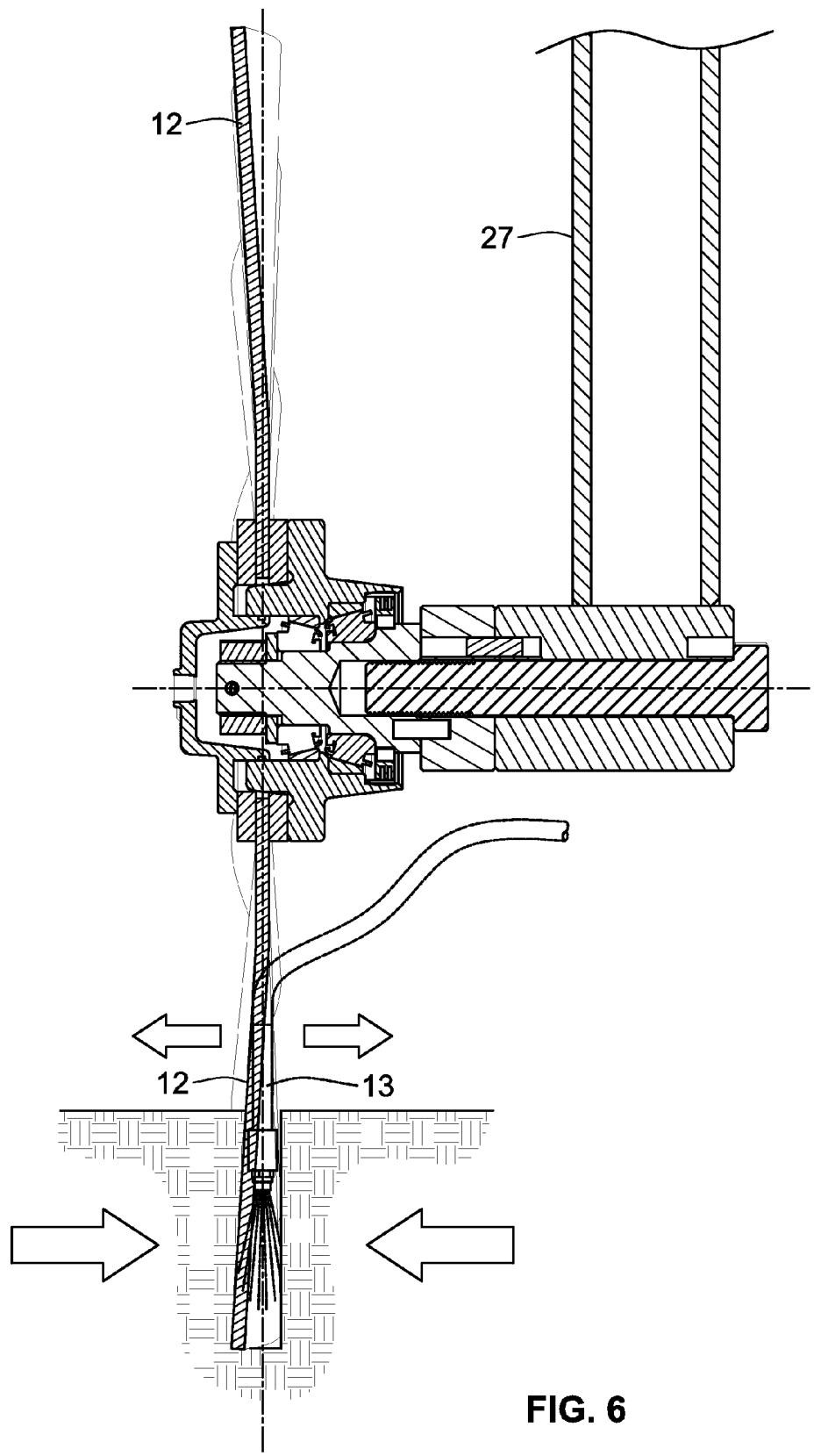
FIG. 6 is a further enlarged section taken along line 6-6 in FIG. 2.

Referring to FIG. 5, the cradle 22 is stepped on its front surface to form one or more undercuts 30 and 31 and a bottom shoulder 32 for engaging a horizontal pin 33 movably mounted in the post 20. The pin 33 can be locked in different positions by a smaller transverse locking pin 34 attached to a handle 34a to facilitate manual insertion and withdrawal of the pin 34. The pin 33 has two transverse holes for receiving the smaller locking pin 34 to lock the pin 33 in different positions. In the position shown in FIG. 5, the pin 33 is in a retracted position where it overlaps only the bottom shoulder 32 so as to limit the range of upward vertical travel of the cradle 22. When the cradle 22 is raised so that the lower undercut 30 is slightly above the top surface of the pin 33, the pin 33 can be moved to its most advanced position to lock the cradle at that elevation.

FIGS. 7A-7C illustrate the pivoting movement of the row units 11 when the tractor 10 follows a curved path to follow the curvature of crop rows R, such as crop rows in a field bounded by a river or creek, or around the base of a steep hill. When the row units 11 are drawn along such a curved path, the forces applied to the outboard sides of the coulter wheels 12 are greater than the forces applied to the inboard sides of those wheels, which causes the row units 11 to pivot about the vertical axes of their respective shafts 18, as depicted in FIGS. 7B and 7C. The row units pivot until the forces applied on opposite sides of the coulter wheels are substantially balanced, such as the positions shown in FIGS. 7B and 7C, where the row units form an acute angle with the tow bar 16. Thus, the coulter wheels 12, the fertilizer dispensers 13 and the closing wheels 14 of each row unit are all spaced about the same distance from the adjacent crop row R being fertilized by that row unit.

FIGS. 8A-8C illustrate what happens when the when the tractor 10 follows the same curved path to follow the curvature of crop rows R, but the row units 11 do not have the capability of pivoting. Without the ability to pivot, the row units 11 remain fixed in positions substantially perpendicular to the tow bar 16. Consequently, the fertilizer dispenser 13 and the closing wheels 14 are spaced farther away from their respective crop rows R than the coulter wheels 12. Also, the angle between each coulter wheel 12 and the direction of travel is increased, which increases the widths of the slits cut in the soil by the coulter wheels, and yet both the fertilizer dispensers 13 and the closing wheels 14 can actually be laterally offset from their respective slits.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural side dressing fertilizer coulter row unit for use with a towing frame hitched to a tractor, said row unit comprising:
   a first attachment plate adapted to be rigidly connected to said towing frame,
   a second attachment plate having a front side pivotably coupled to a rear side of said first attachment plate via a vertical shaft, said second attachment plate being pivotable relative to said first attachment plate about a substantially vertical axis of said vertical shaft,
   a linkage pivotably coupled to said second attachment plate for pivoting movement of a trailing end of said linkage relative to said second attachment plate,
   a tool-carrying stem pivotably coupled to said trailing end of said linkage,
   a coulter wheel rotatably mounted on said stem for forming a slit in the soil,
   a liquid fertilizer dispenser mounted on said stem for dispensing fertilizer into said slit,
   a closing wheel rotatably mounted on said stem, and a biasing element pivotably attached to said linkage and coupled to said second attachment plate for urging said stem downwardly with a controllable force.

2. The agricultural side dressing fertilizer coulter row unit of claim 1 which includes stopping elements located between said first and second attachment plates for limiting the range of pivoting movement of said second attachment plate about said substantially vertical axis.

3. The agricultural side dressing fertilizer coulter row unit of claim 1 in which said biasing element is an air spring.

4. The agricultural side dressing fertilizer coulter row unit of claim 1 in which said linkage is a parallel linkage.

5. The agricultural side dressing fertilizer coulter row unit of claim 1 in which said liquid fertilizer dispenser is positioned to dispense said fertilizer within said slit behind a trailing edge of said coulter wheel.

6. The agricultural side dressing fertilizer coulter row unit of claim 1 in which said closing wheel is positioned directly behind said liquid fertilizer dispenser for closing said slit after said fertilizer has been dispensed into said slit.

7. The agricultural side dressing fertilizer coulter row unit of claim 1 in which said closing wheel has a concave soil-engaging surface.

8. The agricultural side dressing fertilizer coulter row unit of claim 1 in which said biasing element is remotely controllable to permit adjustment of said controllable force produced to urge said stem downwardly toward the soil, thereby permitting adjustment of the downward force urging said coulter wheel and said closing wheel against the soil.

9. The agricultural side dressing fertilizer coulter row unit of claim 1, wherein said second attachment plate is directly pivotably coupled to the rear side of said first attachment plate.

10. An agricultural side dressing fertilizer coulter row unit for use with a towing frame hitched to a tractor, said row unit comprising:
- a first attachment member adapted to be rigidly connected to said towing frame;
- a second attachment member pivotably coupled to said first attachment member for pivoting movement about a substantially vertical axis;
- a parallel linkage pivotably coupled to said second attachment member for pivoting movement of a trailing end of said parallel linkage relative to said second attachment member;
- a tool-carrying stem pivotably coupled to said trailing end of said parallel linkage;
- a coulter wheel rotatably mounted on said stem for forming a slit in the soil;
- a liquid fertilizer dispenser mounted on said stem for dispensing fertilizer into said slit;
- a closing wheel rotatably mounted on said stem; and
- a biasing element pivotably attached to said parallel linkage and coupled to said second attachment member for urging said stem downwardly with a controllable force.

11. The agricultural side dressing fertilizer coulter row unit of claim 10, which includes stopping elements located between said first and second attachment members for limiting the range of pivoting movement of said second attachment member about said substantially vertical axis.

12. The agricultural side dressing fertilizer coulter row unit of claim 10 in which said biasing element is an air spring.

13. The agricultural side dressing fertilizer coulter row unit of claim 10 in which said liquid fertilizer dispenser is positioned to dispense said fertilizer within said slit behind a trailing edge of said coulter wheel.

14. The agricultural side dressing fertilizer coulter row unit of claim 10 in which said closing wheel is positioned directly behind said liquid fertilizer dispenser for closing said slit after said fertilizer has been dispensed into said slit.

15. The agricultural side dressing fertilizer coulter row unit of claim 10 in which said closing wheel has a concave soil-engaging surface.

16. The agricultural side dressing fertilizer coulter row unit of claim 10 in which said biasing element is remotely controllable to permit adjustment of said controllable force produced to urge said stem downwardly toward the soil, thereby permitting adjustment of the downward force urging said coulter wheel and said closing wheel against the soil.

17. A row unit for use with a towing frame, said row unit comprising:
- a first attachment plate adapted to be rigidly connected to said towing frame, said first attachment plate having a rear side with a pair of bosses, each of said bosses having a mounting through hole;
- a second attachment plate having a front side with a cylinder, said cylinder having a mounting through hole;
- a shaft inserted vertically through the mounting through holes of said bosses and said cylinder for pivotably mounting said first attachment plate and said second attachment plate about a substantially vertical axis;
- a parallel linkage pivotably coupled to said second attachment plate for pivoting movement of a trailing end of said parallel linkage relative to said second attachment plate;
- a tool-carrying stem pivotably coupled to said trailing end of said parallel linkage;
- a coulter wheel rotatably mounted on said stem for forming a slit in the soil;
- a liquid fertilizer dispenser mounted on said stem for dispensing fertilizer into said slit;
- a closing wheel rotatably mounted on said stem; and
- a biasing element pivotably attached to said parallel linkage and coupled to said second attachment plate for urging said stem downwardly with a controllable force.

18. The row unit of claim 17, further comprising stopping elements located between said first and second attachment plates for limiting the range of pivoting movement of said second attachment plate about said substantially vertical axis.

19. The row unit of claim 17, wherein said liquid fertilizer dispenser is positioned to dispense said fertilizer within said slit behind a trailing edge of said coulter wheel.

20. The row unit of claim 17, wherein said closing wheel is positioned directly behind said liquid fertilizer dispenser for closing said slit after said fertilizer has been dispensed into said slit.

* * * * *